US006771756B1

(12) United States Patent
Chou et al.

(10) Patent No.: US 6,771,756 B1
(45) Date of Patent: Aug. 3, 2004

(54) SYSTEM AND METHOD TO FACILITATE TEAM COMMUNICATION

(75) Inventors: Paul B. Chou, Monvale, NJ (US); Ted A. Habeck, Fishkill, NY (US); Steve Moimann, Portland, OR (US); Jennifer C. Lai, Garrison, NY (US); Stella J. Mitchell, New York, NY (US); Cezar Pendus, Yardley, PA (US); Jung-Mu Tang, South Salem, NY (US); David A. Wood, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 09/795,524

(22) Filed: Mar. 1, 2001

(51) Int. Cl.[7] ................................................ H04Q 7/32
(52) U.S. Cl. ........................... 379/201.01; 379/210.01; 379/211.01; 379/265.09
(58) Field of Search ........................ 379/88.14, 201.01, 379/211.01, 210.01, 265.09; 455/415, 403, 401, 413, 461, 414, 433; 709/203

(56) References Cited

U.S. PATENT DOCUMENTS 5,903,845 A * 5/1999 Buhrmann et al. ......... 455/461
6,047,053 A * 4/2000 Miner et al. ........... 379/201.01
6,064,878 A * 5/2000 Denker et al. .............. 455/415
6,389,276 B1 * 5/2002 Brilla et al. ................ 455/413
6,430,405 B1 * 8/2002 Jambhekar et al. ......... 455/403
6,438,217 B1 * 8/2002 Huna ....................... 379/88.14
6,542,733 B1 * 4/2003 Dennis ...................... 455/433
6,594,480 B1 * 7/2003 Montalvo et al. ........... 455/401
2002/0052196 A1 * 5/2002 Padawer et al. ............ 455/414
2002/0087627 A1 * 7/2002 Rouse et al. ................ 709/203
2002/0126817 A1 * 9/2002 Hariri et al. ........... 379/201.01
2003/0112952 A1 * 6/2003 Brown et al. .......... 379/211.01

* cited by examiner

Primary Examiner—William J. Deane, Jr.
(74) Attorney, Agent, or Firm—Whitham, Curtis & Christofferson, P.C.; Stephen C. Kaufman

(57) ABSTRACT

A system and method to facilitate communications among team members or subscribers using a virtual assistant and a derived points of contact (POC) list to initiate contacts. The virtual assistant automates the task of reaching a party to be contacted through trying a variety of POC options until a connection is established or the options are exhausted. The system takes advantage of the POC provided by a person to be contacted, reducing the burden of maintaining a complete personal contact list by each team member or subscriber. The virtual assistant uses the derived POC list to establish a preferred method for contacting a team member or subscriber.

21 Claims, 6 Drawing Sheets

SYSTEM AND METHOD TO FACILITATE TEAM COMMUNICATION

BACKGROUND OF THE INVENTION

1. Field of the Invention

The present invention generally relates to a system and method to facilitate communications among various team members or subscribers and, more particularly, to an automated system with a priority connect capability which allows all members or subscribers to keep in touch and facilitate communication.

2. Background Description

Effective team communication is critical to success in today's business world. More and more teams are dynamically formed to achieve specific objectives. And increasingly, team members are geographically distributed and mobile. It is important to have an effective method to help team members to communicate with each other easily and timely.

Adding to the complexity of the problem, an individual may have many ways, or "points of contact" (POC), whereby he or she could be contacted. With the proliferation of various communication devices, it is common for a person to have multiple phone numbers (e.g., office, home, cell), a pager number, a home and an office facsimile number, a few e-mail addresses, and an instant messaging account, etc. Some POC are tied to a specific physical location such as home or office. Some POC only refer to a communication mode such as e-mail or instant messaging which can be accessed using a variety of devices. Some of those POC may be considered "private" to the owner and are shared with only a few selected associates. An individual may also have specific preferences in terms of how he or she should be contacted depending on, for example, the time of the day and the identity of the person trying to make the contact. In addition, POC may change frequently. It could be hard for individuals, e.g., members of a team or subscribers to a system, to keep track of every team member's or subscriber's POC. Helping a user to effectively use the various communication channels in order to reach another team member or subscriber in a manner that is simple for the user and best satisfies the user's intent and the team member's or subscriber's preference is highly desirable. Since a team member's or subscriber's POC indicates the best way to be contacted, the chances of a user making a successful contact to another team member or subscriber are thus increased.

There are currently several personal assistant related services available in the market. They are voice based, using speech technology to handle user interactions. These systems rely on the user to keep track of their own personal contact list and allow calls to be made to an entry in the personal contact list. For example, Wildfire (http://www.wildfire.com) remembers up to 150 personal contacts, with six phone numbers for each. While such services facilitate communications from subscribers to called persons, the automation provided is limited and requires the user to search through a POC they have defined for the called person in order to find and successfully make the desired contact.

SUMMARY OF THE INVENTION

It is therefore an object of the present invention to provide a system and a computer implemented method for keeping team members or subscribers who are not necessarily co-located in touch with each other and facilitating communication.

It is another object of the invention to provide an easy means for the user to reach other team members or subscribers through one of the many team member's or subscriber's POC and to control how and if he or she can be contacted in a variety of contexts.

According to the invention, an automated system, such as a virtual personal assistant, is provided for message and call notification, reminding the user of scheduled activities and to-do's, etc., and includes a priority connect capability. The priority connect capability assists a user with his or her communications by executing communication tasks that are delegated to it. For example, a user can simply ask a virtual assistant with the priority connect capability to "get a hold of Bob". The system would interpret the user's intention and make a best effort to connect to Bob using Bob's points of contact stored in the system.

The virtual assistant of the present invention provides each team member or subscriber of the system with a public points of contact (PPOC) list which he or she populates with his or her particular POC. The team member or subscriber has the ability to set access restrictions such as when and who can use each POC. To allow team members or subscribers easy access to non-team members or non-subscribers and to supercede POC listed for team members or subscribers, each team member or subscriber is also provided with a personal contact list (PCL) in which he or she can list people such as family members, friends, and business contacts, and their corresponding POC. When a team member or a subscriber tries to contact another team member or subscriber, the virtual assistant will derive a POC list based on the other team member's or subscriber's POC (if any) listed in the user's PCL and the POC that are listed in the other team member's or subscriber's PPOC list (if any). The virtual assistant uses this derived POC list to initiate a contact.

As an example, the priority connect might work as follows:

1) The user says to the virtual assistant, "Get hold of Bob".
2) The virtual assistant looks for "Bob" in the user's personal contact list and finds two entries that matches "Bob".
3) The virtual assistant says to the user, "Did you mean Bob Kerry or Bob Hope?".
4) The user responds by saying, "Bob Kerry".
5) Since Bob Kerry is also a subscriber (or team member) of the system, compiles an ordered list of Bob's POC based on the user's PCL for Bob and Bob's PPOC.
6) Following the failure of trying to reach Bob at his office phone number, the virtual assistant automatically calls the next number on the list.
7) When the virtual assistant is successful in contacting Bob, it informs the user, "Here is Bob" and connects the two parties.
8) The user carries out his or her conversation with Bob.

Thus, the present invention provides a much more powerful method to facilitate communication among team members. Each team member can maintain a list of POC to indicate how he or she would like to be contacted. In addition, he or she can also provide a personal contact list to the system. When asked to contact someone, the system uses the information in the user's personal contact list and the other person's POC to make a connection by trying a plurality of the combined POC in an order that best reflects the user's intent and the other person's preferences. The benefits provided by the invention include:

- The system takes advantage of the POC provided by the person to be contacted, reducing the burden of maintaining a complete and up-to-date personal contact list by each of the team members or subscribers to the system.
- The system automatically tries the available POC of the person to be contacted until either a connection is made or the options are exhausted, reducing the user's workload.
- The system intelligently captures the user's intent and tries its best to satisfy it.
- The system respects the preferences of the person to be contacted on how he or she should be contacted by consulting his or her preferred POC list and any access restrictions for those POC.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
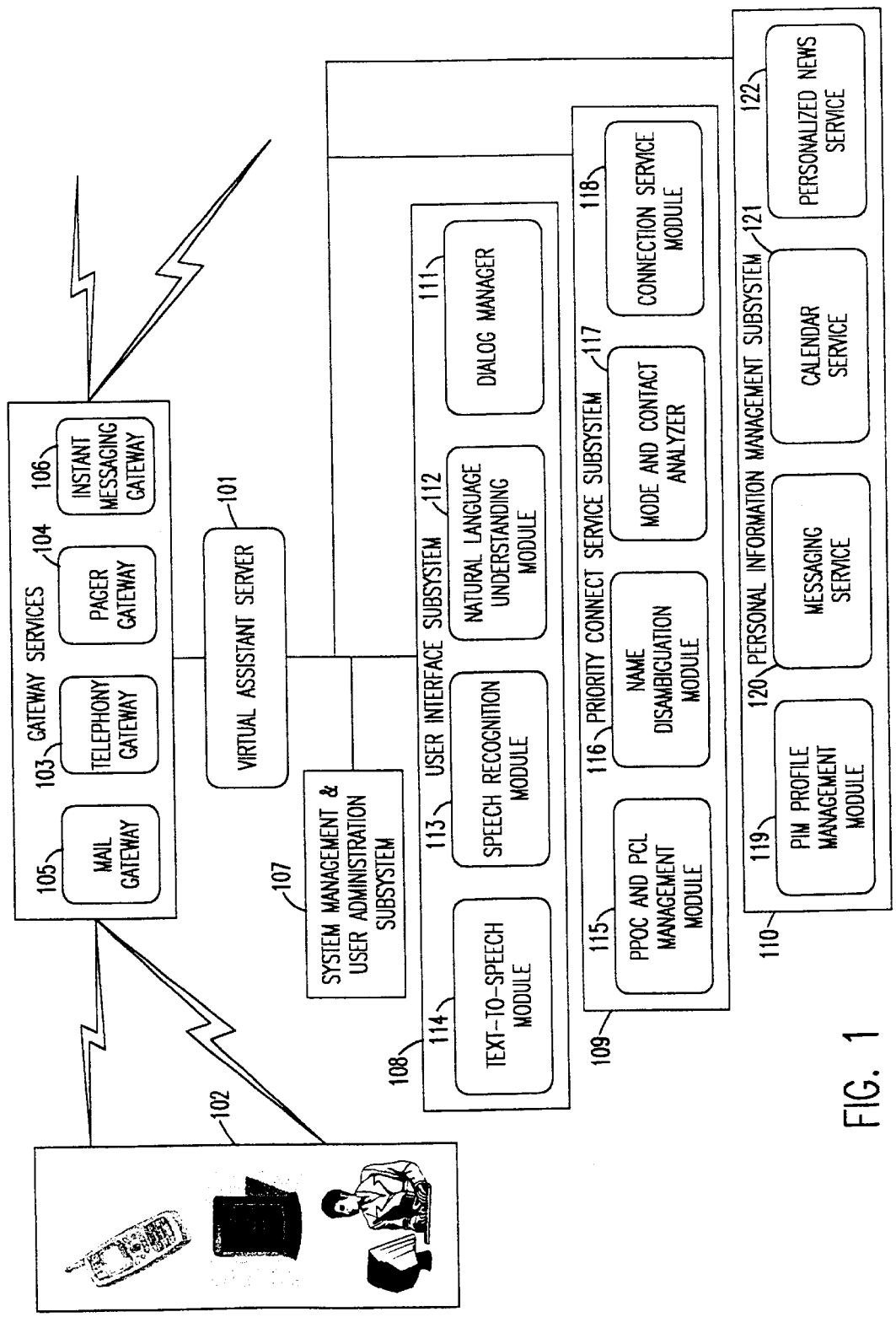
FIG. 1 is a block diagram showing the system architecture according to the invention.

Referring now to the drawings, and more particularly to FIG. 1, there is shown an overview of the system architecture. Central to the system is a virtual assistant server 101. The virtual assistant server 101 can accept user inputs 102 from a variety of user terminals, such as wired and wireless phones through a voice or data connection, a personal computer using a modem, or a personal digital assistant (PDA) with wireless communication capability. The virtual assistant server 101 can make connections to other parties based on the user's request through one or more of the gateway services available in the system, including telephony gateway 103, pager gateway 104, mail gateway 105, and instant messaging gateway 106. The connection can be made to a variety of user terminals with different modes and modalities.

Also shown in FIG. 1 are a set of subsystems and functional modules to be executed by the virtual assistant server. In the embodiment shown, the virtual assistant server can comprise four subsystems: a system management and user administration subsystem 107, a user interface subsystem 108, a priority connect service subsystem 109, and an optional personal information management subsystem 110. The system management and user administration subsystem 107 responsibility includes user account management and system security tasks, such as user authentication. The user interface subsystem 108 provides the mechanism to handle all user-system interactions, bridging the user to the service functions provided by the system. Preferably, it allows the user to interact with the system in a manner that is similar to interacting with a human assistant. The priority connect service subsystem 109 provides the priority connect capability, which is the focus of the present invention. A personal information management subsystem 110 may provide services such as unified messaging, calendar and personalized news. Other subsystems can be added to the virtual assistant server in order to provide additional services.

As shown in FIG. 1, a user interface subsystem 108 can be realized with a dialog manager 111, a natural language understanding module 112, and optionally a speech recognition module 113 and text-to-speech module 114 to support voice-based interactions. The priority connect service subsystem 109 may be realized with four modules as shown in FIG. 1. A PPOC and PCL management module 115 provides the facility to store, update and retrieve subscriber's PPOC and PCL data. A name disambiguation module 116 allows the system to identify the specific person to be contacted. A mode and contact analyzer 117 provides the system with the ability to infer the preferred communication mode or point of contact of the requested communication task. A connection service module 118 carries out the requested communication by trying to connect to the desired person using one of the POC that are consistent with the preferred communication mode. Finally, the optional personal information management subsystem 110 may include a personal information management (PIM) profile management module 119, a messaging service 120, a calendar service 121, and a personalized news service 122, among other modules and services.

Figure 2:
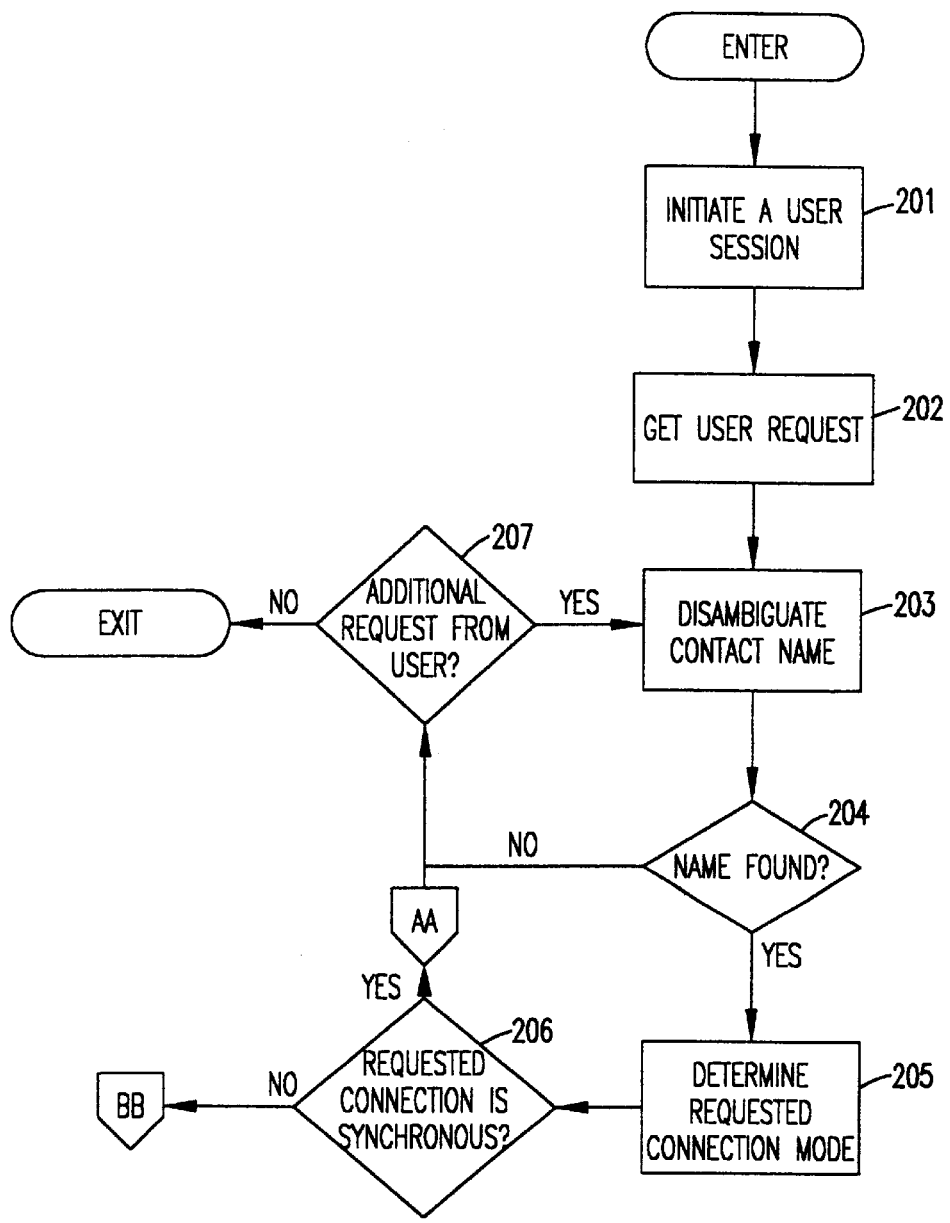
FIG. 2 is a flow chart showing the logic of the priority connect feature of the virtual assistant.
Figure 5A:
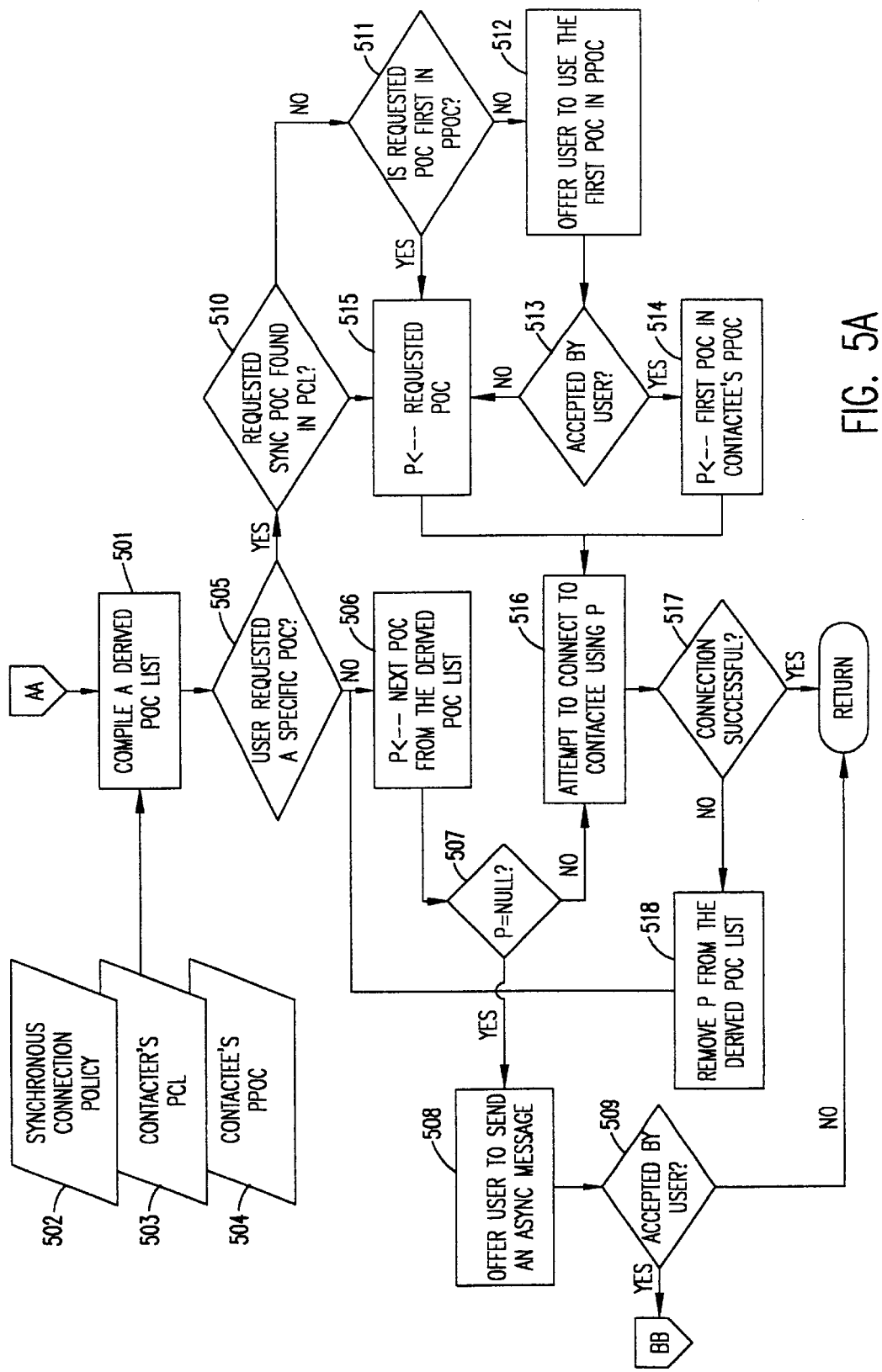
FIG. 5A is a flow chart showing the process for making a synchronous connection.
Figure 5B:
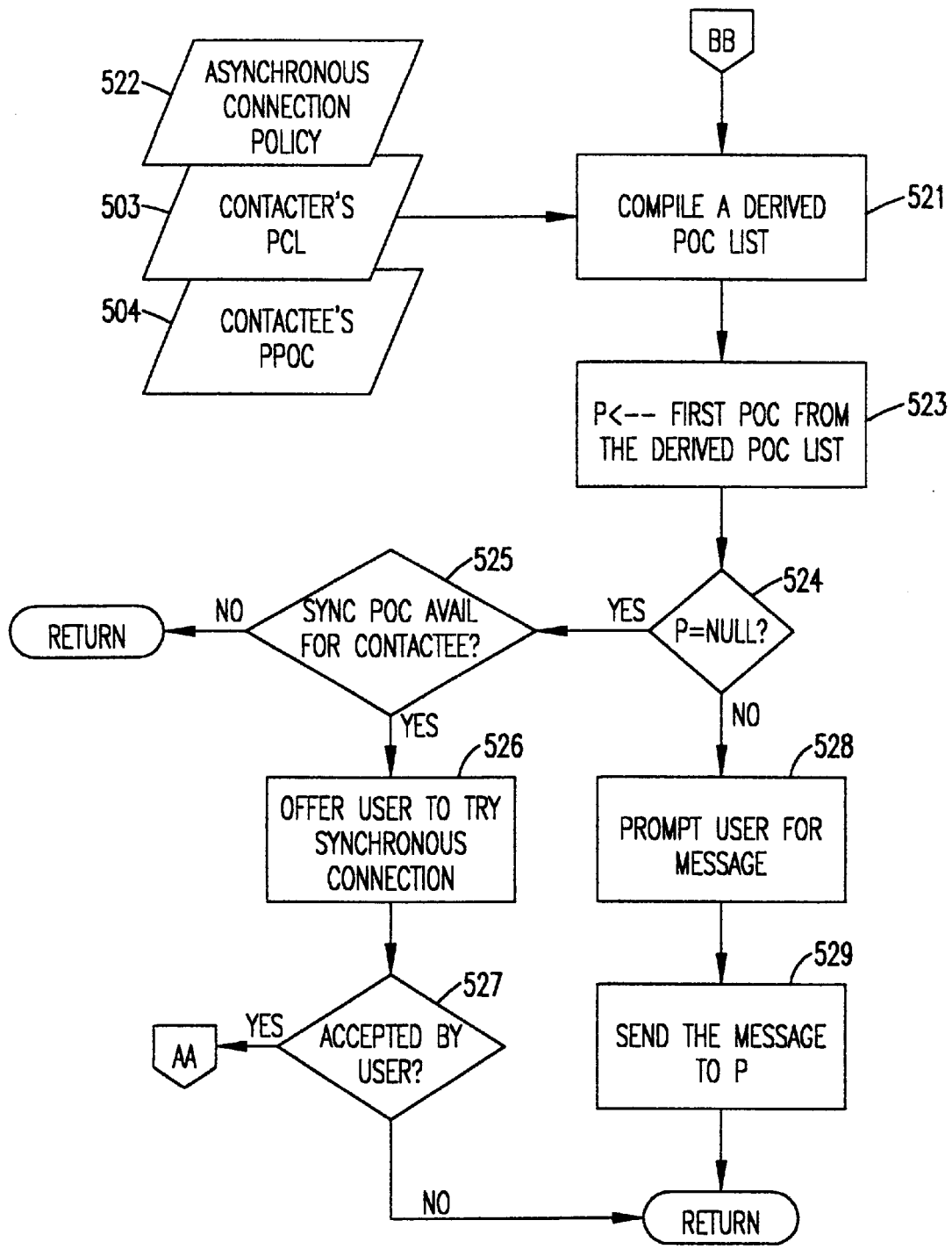
FIG. 5B is a flow chart showing the process for making an asynchronous connection.

FIG. 2 is a flow chart showing the sequence of steps involved in a user/virtual assistant session using the priority connect service 109 of FIG. 1. The process begins in function block 201 by initiating or accepting a user session. This is shown in more detail in FIG. 3. The initiation of the user session is followed by receiving user request in function block 202. The user request is subjected to the disambiguate contact name function of module 116 in function block 203. A determination is made in decision block 204 as to whether a name has been found. If so, the requested connection mode is determined in function block 205 using the mode and contact analyzer module 117. A determination is made in decision block 206 as to whether the connection requested is synchronous. If so, the process of FIG. 5A is called; otherwise the process of FIG. 5B is called. In either case, or if no name was found as determined in decision block 204, a further test is made in decision block 207 to determine if there is an additional priority connect request from the user. If so, the process goes back to function block 203 to disambiguate the contact name; otherwise, the process exits.

Figure 3:
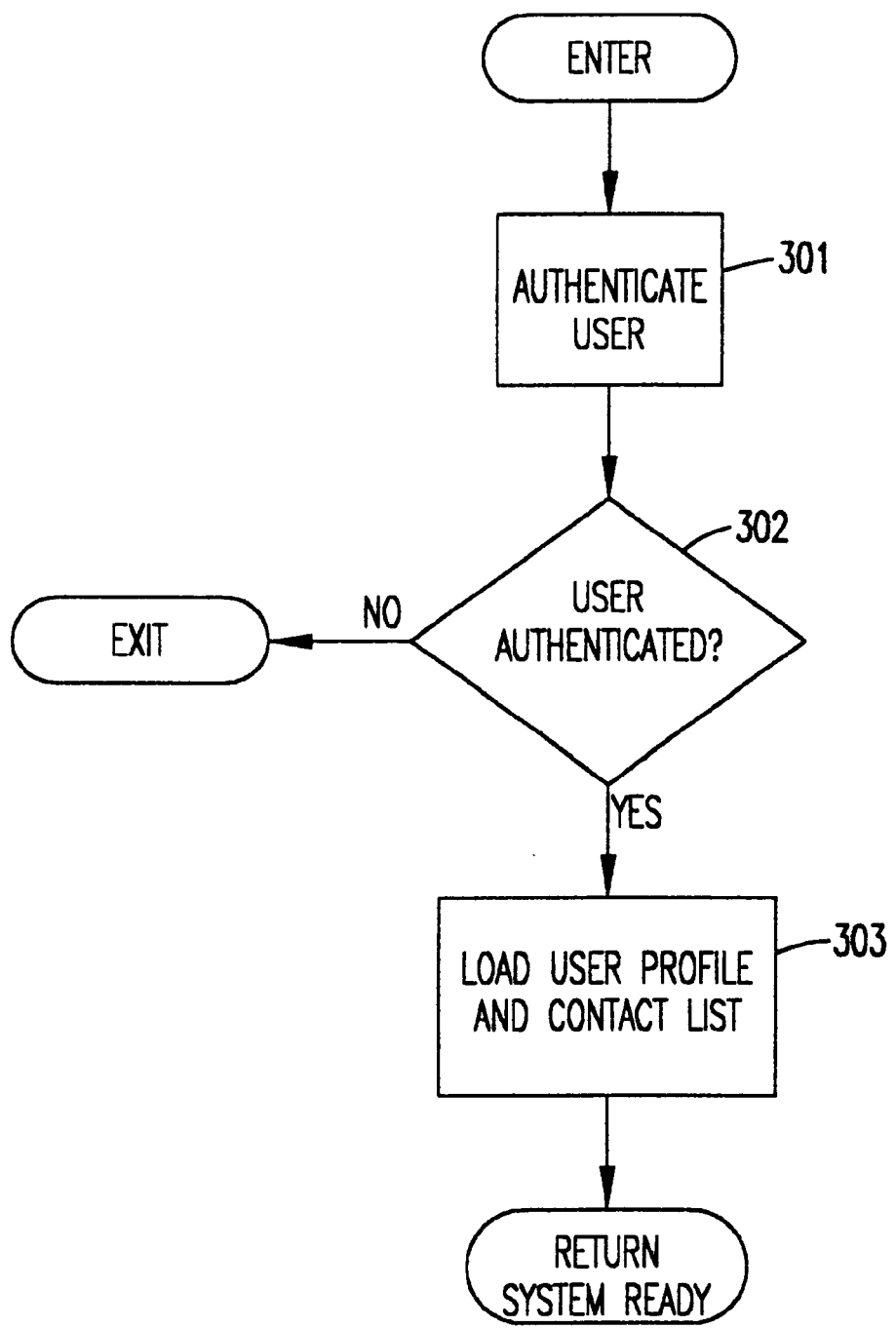
FIG. 3 is a flow chart showing the process for initiating a user session.

FIG. 3 shows the steps that may be involved in initiating a user session represented by function block 201 in FIG. 2. The process begins with function block 301 where the user's authenticity is checked. A determination is made in decision block 302 to determine if the user is authenticated. If not, the process exits, but if the user is authenticated, the user profile and contact list is loaded in function block 303. A return is then made to the main program.

Figure 4:
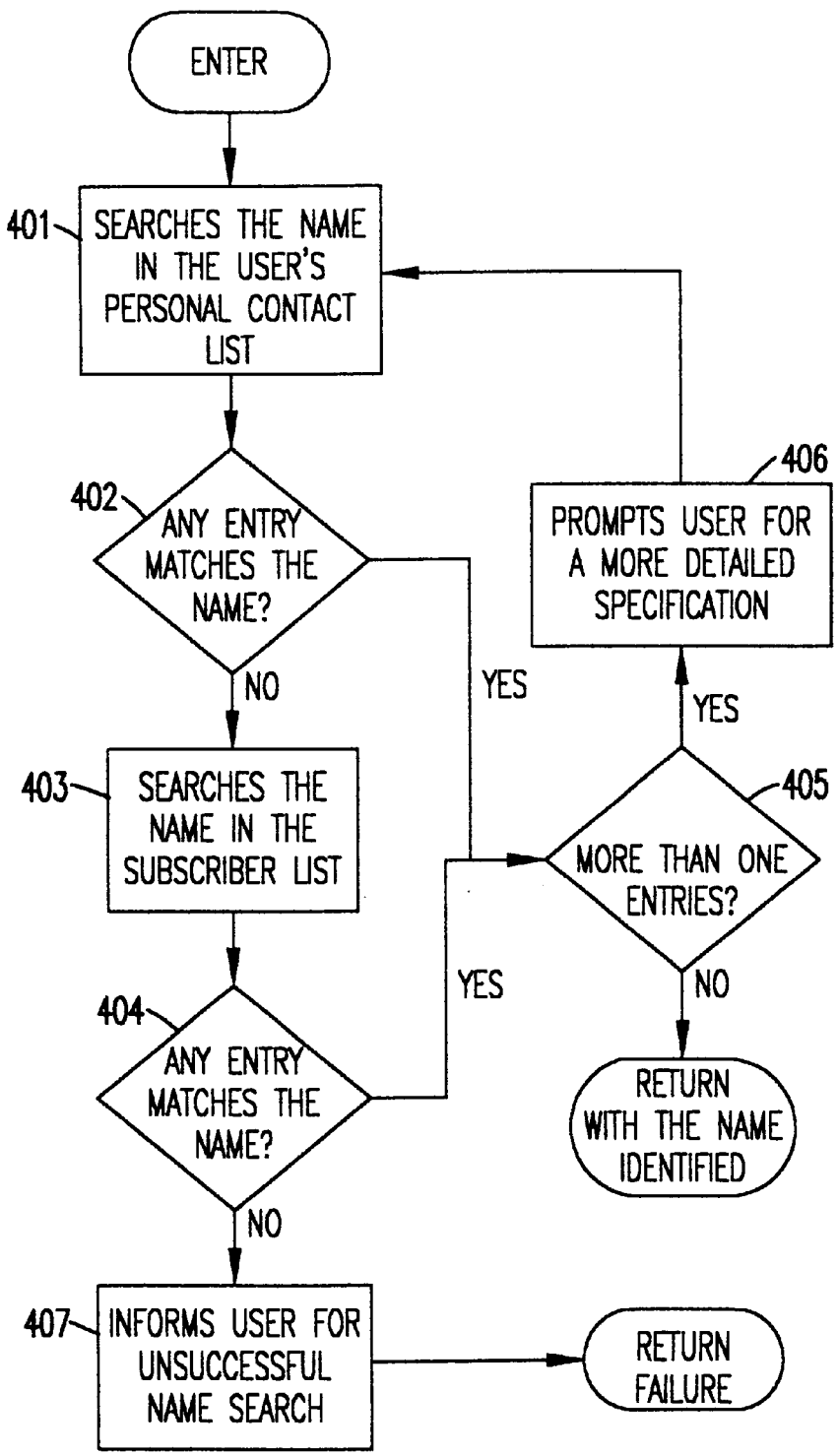
FIG. 4 is a flow chart showing the process of disambiguating the contact name.

FIG. 4 provides a more detailed view on name disambiguation function 203 (FIG. 2) performed by the name disambiguation module 116 (FIG. 1). The PCL is searched first for the name (e.g., "Bob") specified by the user in function block 401. A determination is made in decision block 402 to determine if there is a match in the PCL. If there is no match in the PCL, then the subscriber list (SL) is searched in function block 403. A further test is made in decision block 404 to determine if any entry matches the name. If a name match is found in either of decision block 402 or 404, a further test is made in decision block 405 to determine if more than one entry matches the name. If more than one entry matches the name in either the PCL or the SL, then the virtual assistant will ask the user to be more specific in function block 406, and a return is made to function block 401. For example, the virtual assistant may prompt the user, "Did you want Bob Kerry or Bob Hope?" or "I have found three Bobs in my database. Can you be more specific?". If there is only one match, as determined in decision block 405, then a return is made with the name identified to the main program. If, however, there are no matches for the name, the virtual assistant informs the user of the unsuccessful name search in function block 407, and then returns a failure to the main program.

Communication channels, and thus points of contact, can be generally classified into two connection modes: synchronous and asynchronous. A synchronous connection allows the user to engage in a dialog through the connection with another subscriber, while an asynchronous connection does not require the other subscriber to engage or respond to the user. Phone and online instant messaging such as Lotus Sametime are synchronous. Pager and e-mail are typical examples of asynchronous points of contact. The distinction between the two modes is important as it helps capture the need of the user regarding a particular communication task. If the user does not explicitly state a specific POC or a class of POC (e.g., "call Bob" or "page Bob"), the virtual assistant infers the desired connection mode based on the user's input and tries to reach the other person using a POC of the desired connection mode.

In general, the user can make a number of requests to initiate a contact with another person, who needs not be a team member or subscriber or maintains a PPOC list in the system. User commands may or may not contain a specification for a point of contact (e.g., "get Bob on Sametime") or they may specify a subset of POC (e.g., "get Bob on the phone"). In any of these cases, the system builds a derived list of POC that is consistent with the user's intent. For example, the derived list may contain all of Bob's synchronous POC for "get Bob" request, or all phone-based POC for "call Bob", or only Bob's Sametime address for "get Bob on Sametime". However the derived list is constructed may depend on the user's preference, such as time of day, contacts, etc., or connection policies implemented by the system. This derived POC list is then traversed by the virtual assistant to make the contact. A dialog with the user may be necessary to choose the proper POC (e.g., "Bob does not have a cell phone. Would you like to try his office phone?").

FIGS. 5A and 5B are flow charts showing a preferred implementation for making a synchronous connection and asynchronous connection, respectively. The process of FIG. 5A is called from connector AA in FIG. 2, and the process of FIG. 5B is called from connector BB in FIG. 2.

For synchronous connections (FIG. 5A), the first step is to compile a derived POC list in function block 501. The derived POC list, as dictated by the synchronous connection policy 502, consists of a user specified point of contact, if available, the synchronous POC in the user's PCL 503, followed by all ordered POC in the other person's PPOC 504, and then followed by the asynchronous POC in the user's PCL. Necessary steps are taken to ensure that there is no duplication of POC in the derived list. Only the first occurrence of a duplicated POC is kept in the derived POC list. It is possible to use a different policy or user preference to guide the compilation of the derived POC list. Once a derived POC list is compiled, the system then traverses the list to make a best effort to make a synchronous contact. A determination is made in decision block 505 to determine if the user requested a specific POC. If not, then using an index, p, the next POC from the derived POC list is accessed in function block 506. A determination is made in decision block 507 as to whether p is null, that is, there are no other POC in the derived POC list. If there are no other POC in the derived POC list, meaning that no synchronous contact can be successfully made, then the system may suggest to the user possible available asynchronous connections in function block 508. If the user accepts the suggestion as determined in decision block 509, then the process goes to the asynchronous connection process shown in FIG. 5B via connector BB. If any asynchronous POC is ever used to send a message, then the connection is considered to have been successfully made. If the user does not accept the offer to send an asynchronous message, then a return is made to the main program.

Returning to decision block 505, if the user requested a specific POC, a determination is made in decision block 510 as to whether the requested synchronous POC is found in the PCL. If so, the connection is attempted in function block 515. If not, the process goes to decision block 511 where a determination is made as to whether the requested POC is the first of the PPOC in the derived POC list. If the requested POC is not the first of the PPOC in the derived POC list, then the system may suggest to the user in function block 512 to try the first POC in the PPOC of the person to be contacted. This is done regardless of whether or not the first POC in the PPOC list is asynchronous or synchronous. If the first PPOC is rejected by the user as determined in decision block 513, then the process goes to function block 515 where the requested POC is assigned for use. If the user accepts, the process tries the first POC in the PPOC of the person to be contacted in function block 514.

An attempt to connect is made in function block 516. This point in the process is arrived at either from decision block 507 or function blocks 514 or 515. If connection fails as determined in decision block 517, then the POC tried is removed from the derived POC list in function block 518, and the system traverses other POC in the derived POC list by returning to function block 506. If the connection is successful, a return is made to the main program.

Similarly, for asynchronous connections (FIG. 5B), the first step is to compile a derived POC list in function block 521. The derived POC list, as dictated by the asynchronous connection policy 522, consists of the user specified point of contact, if available, the asynchronous POC in the user's PCL 503, if any, followed by all asynchronous POC in the other person's PPOC 504. Using the index, p, the first POC from the derived POC list is accessed in function block 523. A determination is made in decision block 524 as to whether p is null. If there is no asynchronous POC available, a further test is made in decision block 525 to determine if there is a synchronous POC available for the person to be contacted. If not, a return is made to the main program; otherwise, the system may suggest in function block 526 to the user synchronous connections, if any synchronous POC exists in the user's PCL or the other person's PPOC. A determination is made in decision block 527 as to whether the user has accepted this suggestion and, if so, the process goes to the process for making a synchronous connection (FIG. 5A) via connector AA; otherwise, a return is made to the main program.

If an asynchronous connection is available, as determined in decision block 524, the user is prompted for a message in function block 528. Once the user has supplied the message, the message is sent to the person to be contacted in function block 529. A return to the main program is then made.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for facilitating communications among a group of people comprising the steps of:
   storing a points of contact (POC) for each member of the group, the POC for a member controlling how a member of the group can be contacted in a variety of contexts;
   providing each member of the group with a public points of contact list (PPOC) which the member populates with his or her POC;
   providing each member of the group with a personal contact list (PCL) in which the member can list members of the group and other people and their POC;
   responding to a user request to contact a member of the group by compiling for the user, the user being a member of the group, a derived POC list from the user's PCL and the PPOC of the member to be contacted;
   determining whether the user has requested a specific connection mode or POC; and
   attempting to make the requested connection using a requested connection mode or POC if requested.

2. The method for facilitating communications among a group of people as recited in claim 1, wherein the steps of responding, determining and attempting are performed by a computer implemented method.

3. A system for facilitating communications among a group of people comprising:
   a gateway services system providing members of the group with communications connections; and
   a virtual assistant server connected to the gateway services system and including a priority connect service subsystem for connecting a user to another member of the group, comprising:
   a PPOC and PCL management module providing a facility to store, update and retrieve subscriber's PPOC and PCL data;
   a name disambiguation module allowing the system to identify the specific person to be contacted;
   a mode and contact analyzer providing the system with the ability to infer a preferred communication mode or point of contact from a communication task request of the user, and to derive for the user a POC from said other member's PPOC and the user's PCL; and
   a connection service module carrying out the requested communication by trying to connect to the desired person using one of the POC that are consistent with the preferred communication mode.

4. The system for facilitating communications among a group of people recited in claim 3, wherein the modules which comprise the virtual assistant server are implemented in computer software.

5. A method for facilitating communications comprising the steps of:
   storing one or more lists of points-of-contact (POC);
   choosing for a user a valid set of POC for a specified person to be contacted, said valid set being compiled for the user from one or more of a POC maintained by the user and a POC maintained by the specified person; and traversing said valid list of POC until contact is made or the list is exhausted.

6. The method for facilitating communications recited in claim 5, further comprising the step of selecting a POC based on access controls defining who or what service may use an individual POC.

7. The method for facilitating communications recited in claim 5, further comprising the step of selecting a POC based on time controls defining when an individual POC may be used.

8. The method for facilitating communications recited in claim 5, further comprising the step of selecting a POC from a defined list provided by a person to be contacted.

9. The method for facilitating communications recited in claim 5, further comprising the step of selecting a POC from a personal contact list, of the user, defined for people the user contacts.

10. The method for facilitating communications recited in claim 5, further comprising the step of selecting a POC from both a defined list provided by a person to be contacted and a personal contact list, of the user, defined for people the user contacts.

11. The method for facilitating communications recited in claim 10, further comprising the step of selecting a POC based on a synchronous or asynchronous mode.

12. The method for facilitating communications recited in claim 5, further comprising the step of selecting a POC based on a specification of a communication method selected from the group consisting of phone, instant message, e-mail and page.

13. The method for facilitating communications recited in claim 5, further comprising the step of selecting a POC based on a specification of a specific POC.

14. The method for facilitating communications recited in claim 5, further comprising the step of selecting a POC based on a synchronous or asynchronous mode.

15. The method for facilitating communications recited in claim 5, wherein an initiator of the step of choosing is a computer implemented method and a plurality of persons are to be contacted with notifications of events.

16. The method for facilitating communications recited in claim 15, wherein notification is made to a plurality of POC.

17. The method for facilitating communications recited in claim 15, wherein notification is made to a plurality of asynchronous POC.

18. The method for facilitating communications recited in claim 5, further comprising the step of providing a user with a conversational interface through which the user can specify a person to be contacted and a mode and a specification of a specific POC to be used for the contact.

19. The method for facilitating communications recited in claim 18, further comprising the step of disambiguating an ambiguously specified person to be contacted, the step of disambiguating including the step of prompting the user to provide more information about the person to be contacted.

20. The method for facilitating communications recited in claim 19, wherein the step of prompting depends on a number of names that match an ambiguously specified person to be contacted.

21. The method for facilitating communications recited in claim 19, wherein the step of prompting depends on an ambiguously specified connection mode.

* * * * *

UNITED STATES PATENT AND TRADEMARK OFFICE
CERTIFICATE OF CORRECTION

| | | |
|---|---|---|
| PATENT NO. | : 6,771,756 B1 | Page 1 of 1 |
| APPLICATION NO. | : 09/795524 | |
| DATED | : August 3, 2004 | |
| INVENTOR(S) | : Chou et al. | |

It is certified that error appears in the above-identified patent and that said Letters Patent is hereby corrected as shown below:

On the Title page Item [75] of the patent the name of an inventor -- Steve Heitmann -- was misspelled as "Steve Moimann".

Signed and Sealed this

Sixteenth Day of October, 2007

JON W. DUDAS
*Director of the United States Patent and Trademark Office*